July 9, 1946.  K. W. COUSE  2,403,848
POWER TAKE-OFF STRUCTURE
Filed June 28, 1945  7 Sheets-Sheet 1

INVENTOR.
Kibber W. Couse
BY
A. D. T. Libby
ATTORNEY.

July 9, 1946. K. W. COUSE 2,403,848
POWER TAKE-OFF STRUCTURE
Filed June 28, 1945 7 Sheets-Sheet 4

INVENTOR.
Kirbbey W. Couse
BY
A. D. T. Libby
ATTORNEY.

July 9, 1946.   K. W. COUSE   2,403,848
POWER TAKE-OFF STRUCTURE
Filed June 28, 1945   7 Sheets-Sheet 5

INVENTOR.
Kibbey W. Couse
BY
A. D. T. Libby
ATTORNEY.

July 9, 1946.　　　K. W. COUSE　　　2,403,848
POWER TAKE-OFF STRUCTURE
Filed June 28, 1945　　　7 Sheets-Sheet 6

INVENTOR.
Kibbey W. Couse
BY
A. D. T. Libby
ATTORNEY

Patented July 9, 1946

2,403,848

UNITED STATES PATENT OFFICE 2,403,848

POWER TAKE-OFF STRUCTURE

Kibbey Whitman Couse, Newark, N. J.

Application June 28, 1945, Serial No. 602,117

13 Claims. (Cl. 74—11)

This invention relates to a power take-off structure and related elements for use in connection with automotive vehicles of the general classification of trucks and especially those referred to in the trade as having a "6 x 6" or "4 x 4" chassis.

It is one of the objects of my invention to provide a power take-off structure such that it may be positioned adjacent the cab of the vehicle and between as well as to some extent under the two seats of the cab. While being so positioned the construction as such does not interfere with the normal seating capacity of the cab or the normal arrangement of the control mechanisms which are operated from within the cab.

A further object of my invention is to provide automatic releasing means of the devices which engage the main control member of the power take-off during the shifting operation whereby all friction is eliminated from this control member during the operation of the power take-off structure.

Another object of my invention is to provide an improved type of inner control device for the power take-off structure whereby any binding or dead centering of the moving parts is eliminated.

Another object of my invention is to provide an improved means for lubricating the internal mechanisms of the power take-off structure.

A further object of my invention is to provide a structure in which the parts thereof are grouped as units to make it easier and faster to assemble and disassemble the entire structure.

These and other objects will be apparent to one familiar with this type of mechanism from the following specification taken in connection with the annexed drawings wherein:

Figure 4 is a view on the line 4—4 of Figure 3a.

Figure 5 is a view on the line 5—5 of Figure 3a.

Figure 6 is a section of the casing showing the methods of attaching the two halves of the casing at any one point.

Figure 7 is a view on the line 7—7 of Figure 6.

In the different views wherein like numbers refer to corresponding parts 1 illustrates broadly a framework on which the power take-off structure has a casing composed of two parts 2 and 3 which are held together by a plurality of screws 68 which are positioned in bosses 69 integral with the casing parts. The casing at one end carries a bearing which is held in place by a plate 5 and locking screws 6. A support member 7 carries a member 8 that is splined to a driving shaft 9. The inner end of the member 8 has an annular flange 10 which is positioned closely adjacent and extends beyond the inner end of member 7. The flange portion 10 has a projecting annular rim 11 which has internal gear teeth 12 which are in continual mesh with gear teeth 13 on the end of a sleeve 14.

Figure 3:
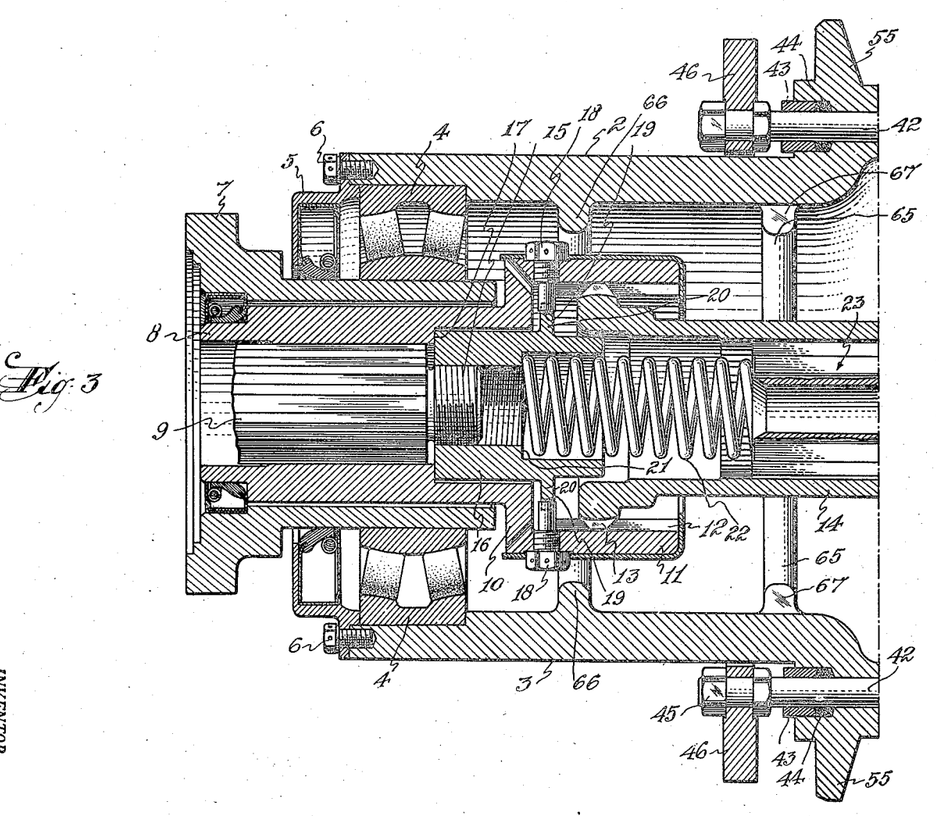
Figure 3 is a longitudinal section of the left hand end of the power take-off structure per se.
Figure 3A:
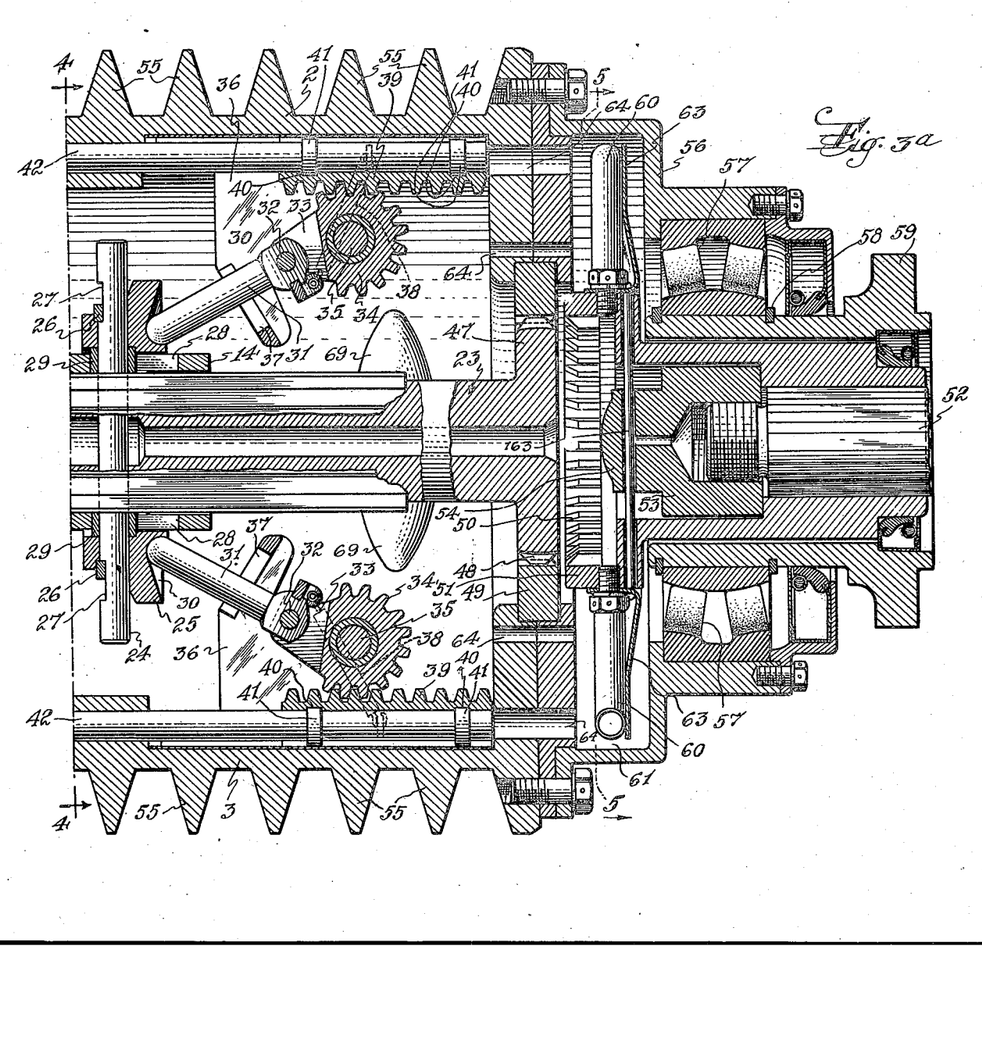
Figure 3a is a view similar to Figure 3 of the right hand end of the structure shown in Figure 3.
Figure 4:
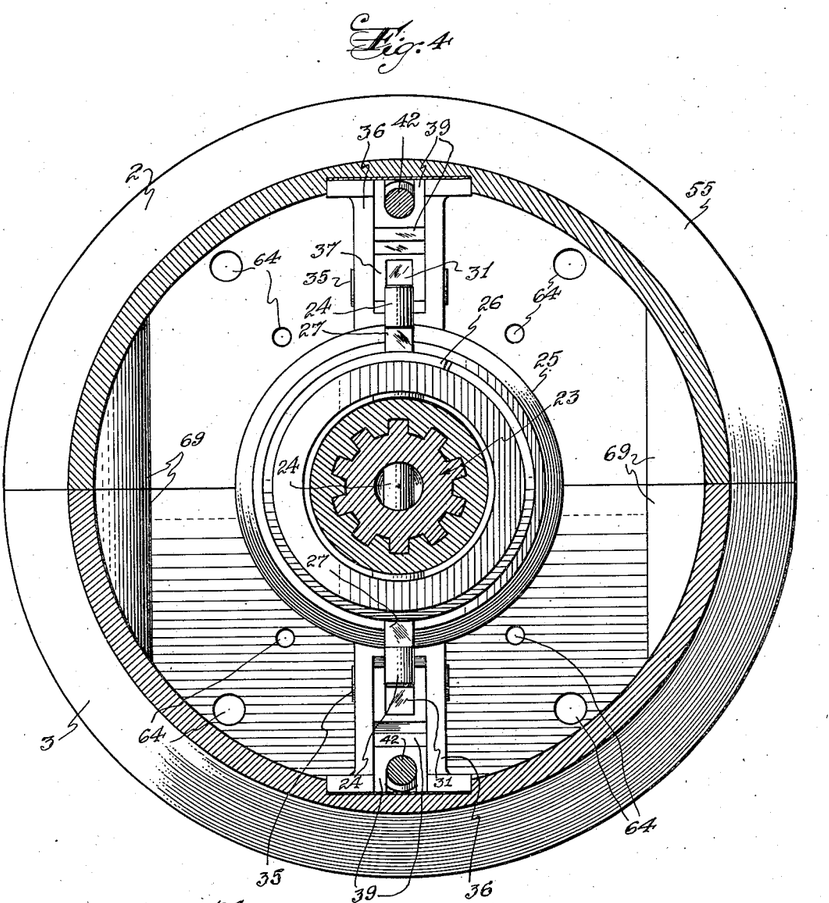

The inner end of the driving shaft 9 has threads 15 to receive a threaded collar 16 which abuts against an annular shoulder 17 on the member 8 where it is held in place by a plurality of set screws 18 carried by the annular rim 11 of the member 8. The inner end of the screws 18 project into notches 19 in a flange 20 formed on the collar 16. The collar 16 has a recess terminating in a seat 21 for a heavy spring 22, the opposite end of which sets against the end of the stud 23. The stud 23 is fastened to the sleeve 14 by a pin 24 that also passes through a circular member 25 and is held in position thereon by a spring lock washer 26 that sets in recesses 27 in the pin 24 as well as in an annular recess in the member 25. The sleeve 14 has oppositely positioned slots 28 therein and slidably positioned in each of these slots are bushings 29 through which the pin 24 passes. The member 25 has a pair of oppositely disposed arcuate surfaces 30 to act as abutments for shifting pins 31. This service permits the pins to center their push correctly without binding. The pins 31 are pivoted at 32 to projections 33 forming part of its cooperating pinion 34. Each of the pinions 34 are operatively carried on a stub shaft 35 held in a support member 36 that in turn is fastened to its casing part, either 2 or 3, in a satisfactory manner. Each of the pins 31 passes through its cooperating opening 37 in a part of the support member 36 which also carries springs 38 that are interconnected with their respective pins to cause them to follow the abutment surfaces 30 and the sleeve 14 if this sleeve is moved. Each of the pinions 34 meshes with its cooperating rack 39 slidably mounted on the inner peripheral wall of its casing part 2 or 3 and as shown in Figure 3a, which illustrates one position of operation, abuts against the end wall of the casing. Each of the racks 39 has a longitudinal recess therein and grooves 40 formed therein near its opposite ends to receive collars 41 integral with or fastened to rods 42 that extend through a gland 43 and packing 44 preferably of the self-lubricating type. To the outer end of the rods 42 is securely mounted as by nuts 45, a ring 46 to which reference will be later made.

The stud 23 has a flange 47 that is provided with clutch teeth 48 which are adapted to engage corresponding clutch teeth in a member 49 fastened to the casing. The clutch teeth of the flange 47, as shown in Figure 3a, are in engagement with the clutch teeth of member 49 but it will be readily observed that the sleeve 14 and the studs 23 are adapted to be moved to the right, as will be later explained, so that the clutch teeth 48 will engage the clutch teeth 50 on the member 51 which is held to the shaft 52 by splines and also by nut 53 positioned on the threaded end of the shaft 52. The lock nut 53 has a rounded end 54 to act as a stop member for the flange 47 when it is moved into driving engagement with the member 51, and a tie pin 163 prevents the nut 53 from turning off the shaft 52.

The casing is provided with a plurality of annular V shaped portions 55 to receive a plurality of belts to which reference will later be made. Fastened to the casing is a closure member 56 which carries an anti-friction bearing 57 one member of which is positioned by snap rings 58 on a support member 59.

Figures 5, 6, 7:
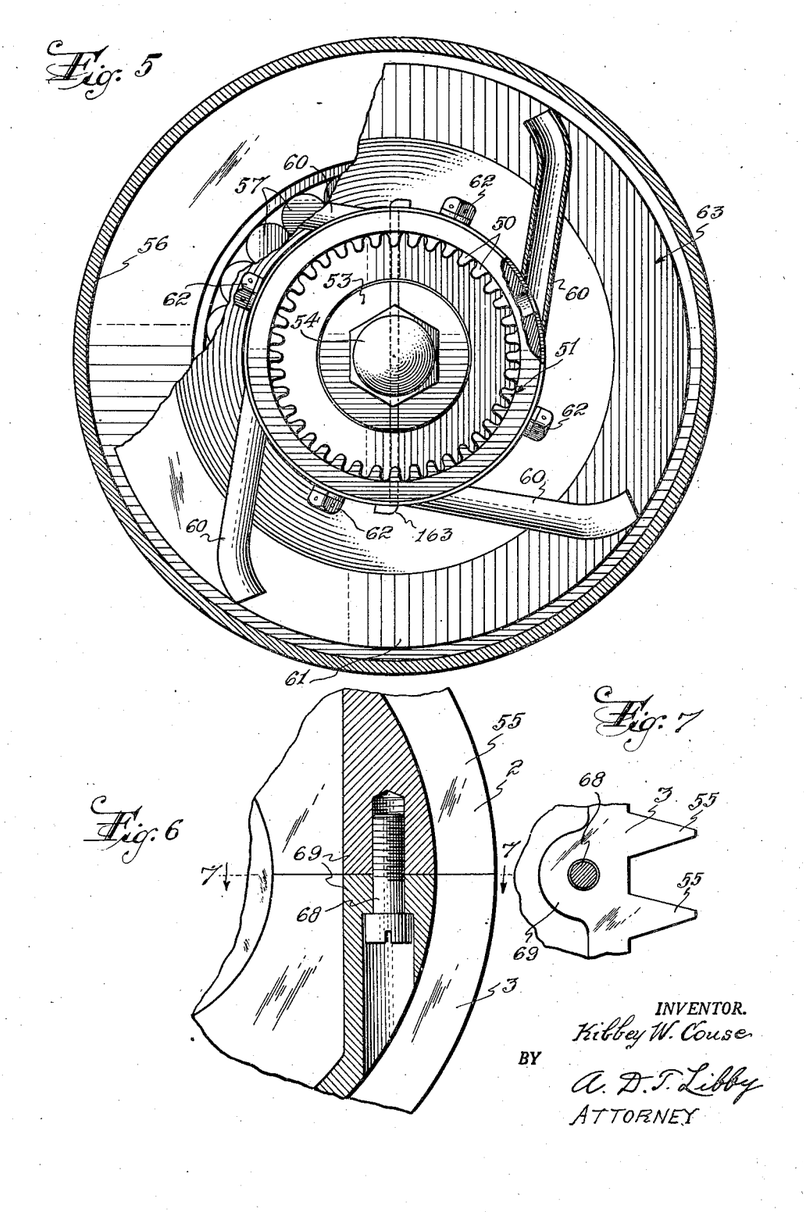

Carried by the member 51 is a plurality of oil tubes or scoops 60, four being illustrated in Figure 5. The free ends of the tubes 60 are bent inwardly so as to better pick up the lubricating oil from the sump 61 as the member 51 is rotated. The member 51 also has fastened thereto as by studs 62 a member 63 which acts as a deflector to turn the oil inwardly as it is discharged by the centrifugal action from the tube 60. It will be noted that parts of the casing has openings 64 to allow the oil to pass through to the interior of the casing and over the parts as have heretofore been described. By reference to Figure 3 it will be noted that there are two annular bosses 65 and 66 which may be made integral with the casing members. These annular bosses act as dams to direct the oil coming from the tubes 60 around and into the sleeve 14 and associated parts. The dam 65 is provided with a plurality of orifices 67 to allow the oil to flow back to the sump portion of the casing. For some installations the drive end of the casing may be required to be shortened in which case one of the bosses may be readily eliminated either in the pattern or by a small amount of machine work, so that special castings will not be required for various lengths of structures.

Figure 8:
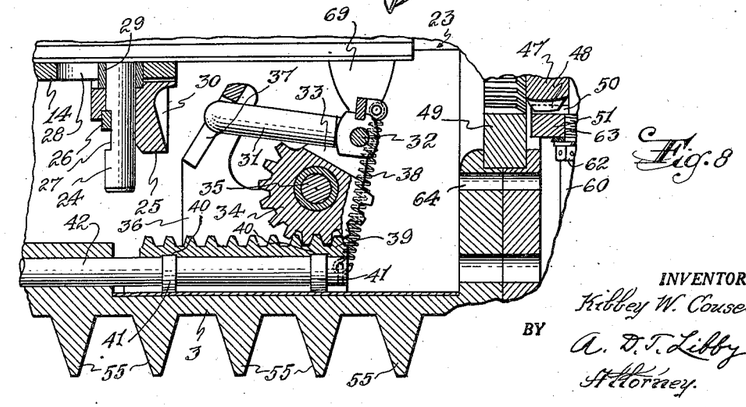
Figure 8 is a fragmentary sectional view of the lower left hand part of Figure 3a but showing certain of the shifting devices in other positions of operation.
Figure 9:
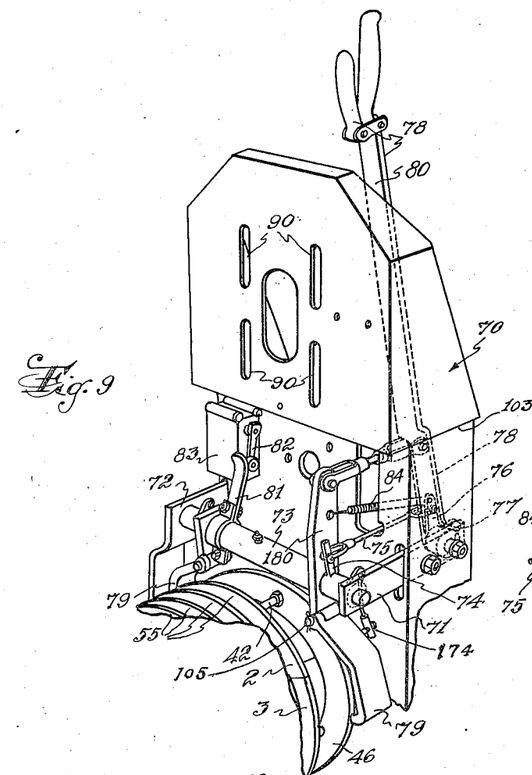
Figure 9 is a perspective view of one of the housing members looking in the direction of an arrow 9—9 of Figure 2, with certain of the parts eliminated in order to more clearly show certain of the control levers.
Figure 10:
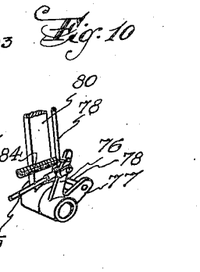
Figure 10 is a view approximately of the lower end of the main power shift lever and associated link engageable members.

In Figures 9 and 10 I have shown means for acting on the ring 46 for operating the internal mechanism of the power take-off structure as heretofore described. In Figure 9 a housing member 70 carries a pair of side support members 71 and 72 between which is rotatably mounted a member 73 to which is fastened a stud 74. To the stud 74 is connected a tie rod 75 fastened to an arm 76 which is integral with a member having another arm 77 to which a rod 78 is fastened and operated by a finger clutch member 78 so when this is operated the member 73 is rotated to move by linkages 174, the forked fingers 79 are pivoted at 105 on a lever 180 rotatably carried on 73 and connected to lever 80 into engagement with opposite sides of diametrically spaced parts of the ring 46. By pulling on the lever 80, the ring 46 will be pulled away from the casing so as to move the rods 42 and racks 39 and gears 34 to the position shown in Figure 8 whereby the spring 22 will force the stud 23 and its flange 47 into a position whereby its clutch teeth 48 will engage the clutch teeth 50 thereby making connection from the driving shaft 9 to the driven shaft 52. When this operation is performed, it will be noted that a lever arm 81 carried by the member 73 is moved into a position to engage a switch arm 82 on an electrical switch 83 which acts to open the circuit of any electrical apparatus such as a dynamotor that may be connected at the time to some outside source of power. When it is desired to use the power take-off structure for driving some piece of apparatus on the truck or traveling machine shop, the control lever 80 is operated to shift the ring 46 so as to move the parts back into position shown in Figure 3a and upon release, the rod 78 and spring 84 will move the split fingers 79 away from the ring 46 so this will run absolutely free of any frictional engagement with the fingers 79 and associated parts. This I consider to be an important feature as it eliminates all wear on the shifting ring.

Figure 1:
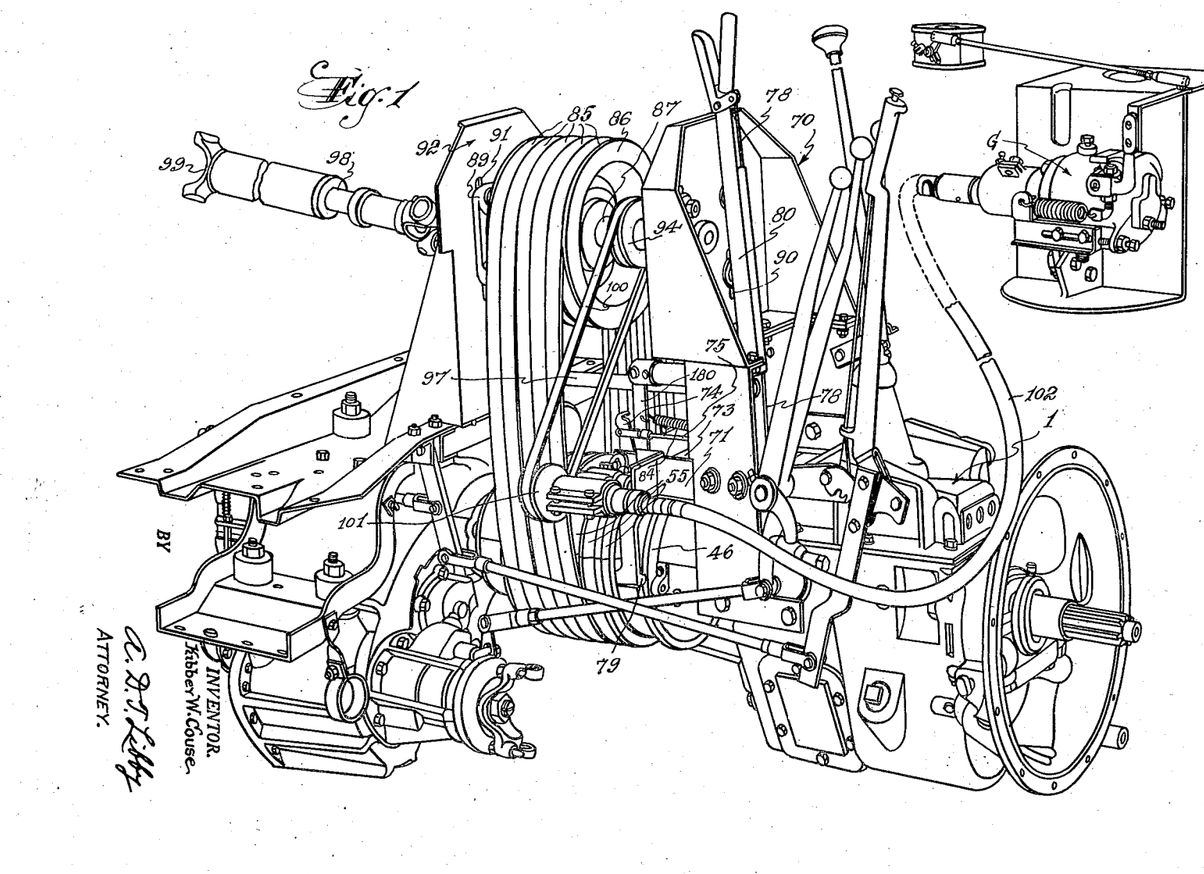
Figure 1 is a perspective view looking toward the control levers.
Figure 2:
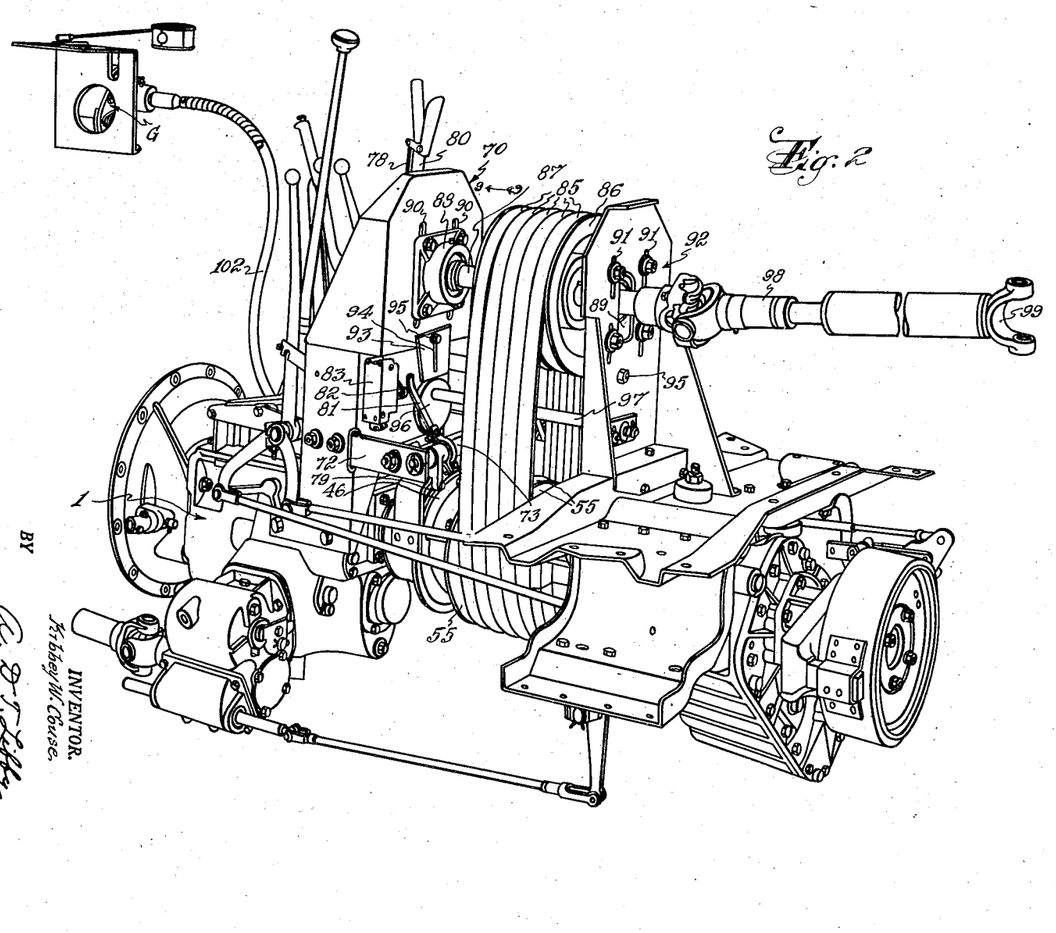
Figure 2 is a view similar to Figure 1 but looking at the assembled structure in the opposite direction from Figure 1.
Figure 11:
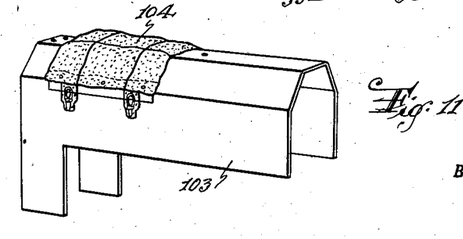
Figure 11 is a perspective view of the cover device used in the combination.

It will be noted from Figures 1 and 2 that the belts 85 coming from the power take off drive as heretofore described pass over a pulley 86 which is carried by a shaft 87 that is supported between bearings 88 and 89. These bearings are adjustably mounted in slots 90 positioned into frame support member 70 and slots 91 in the frame support member 92. In order to get a uniform adjustment or tension on the belts 85 the bearings 88 and 89 for the shaft 87 are adapted to be engaged by plates 93 on the frame member 70 and the other on the member 92. Each of these plates 93 has a slot 94 therein which is adapted to receive a clamping stud 95. Plates 93 are of considerable width to engage a considerable portion of the bottom edge of the bearings 88 and 89. In order to move the plates 93 into engagement with the bearings 88 and 89, a pair of cams 96, being carried on the opposite ends of a shaft 97 so as to simultaneously engage the adjusting plates 93 after they have been loosened by their respective holding studs 95. The shaft 97 is adapted to be turned by a wrench applied to an end of the shaft which projects through the lower portion of either of the support members 70 and 92, whichever is found to be more convenient. This construction makes an easy, very positive and uniform manner of adjusting the bearings for the shaft 87. This shaft is connected to a driving member or shaft 98 which may be coupled by coupling 99 to any suitable cooperating member from which power may be taken from the truck or shop engine controlled by the usual levers and transmission T but since these parts form no part of my present invention, no further description seems necessary. It may be mentioned, however, that there is connected to the shaft 87 a pulley 94 connected by a belt 100 to a pulley 101 which is used to drive a flexible shaft 102 that operates the governor G and associated parts for controlling the speed of the engine while the power take-off structure is being utilized. It may also be mentioned that a housing 103 such as shown in Figure 11 is provided to fit over the upper portions of the supports 70 and 92 and over the belts 85. This shield housing is preferably provided with a swinging padded portion 104 for the purpose of giving access to the power take-off mechanism and also to protect the personnel that utilize the seats on each side of this shield member, it being understood that these seats are positioned so that the control levers as shown in Figures 1 and 2 are within reach of the operator in a seating position.

What I claim is:

1. In a power take-off structure having a casing with its outer surface adapted to receive means for transmitting power from the casing which has bearings at each end carried in support means with a driving shaft projecting through the support means at one end of the casing toward the interior thereof and operatively carrying a member having clutch teeth and a driven shaft projecting through the support means at the other end of the casing toward the interior thereof and operatively carrying on the end a member having clutch teeth, with a sleeve positioned between and in alignment in the said inner ends and having clutch teeth slidably meshing with the clutch teeth on said member carried by the driving shaft, a stud having one end entering the sleeve with means for operatively fastening the stud and sleeve together, the other end of the stud terminating in a toothed flange adjacent the clutch teeth of said member on the driven shaft, a spring interposed between the inner end of the stud and the driven shaft, a member fixed to the casing and having clutch teeth to be engaged by said toothed flange and means within the casing for shifting the sleeve and stud to cause said clutch teeth on the flange to engage either the clutch teeth on the member carried by the driven shaft or the clutch teeth of the member carried by the casing; said last mentioned means including shifting devices for acting on said sleeve and co-acting stud, said shifting devices comprising in part a circular member mounted on said sleeve by means fastened to the stud, said member having oppositely disposed arcuate surfaces to act as abutments, and a pair of racks and pinions positioned on opposite sides of the sleeve and stud, the pinions having pins extending into engagement with said arcuate abutment surfaces and means connected to the racks and extending outside the casing for shifting them and the sleeve and stud in at least one direction for the purpose described.

2. A power take off structure as set forth in claim 1 further characterized in that said circular member is mounted on said sleeve so as to have at least a small amount of longitudinal movement thereon.

3. A power take off structure as set forth in claim 1 further characterized in that said circular member is mounted on said sleeve by a pin going clear through said member, the sleeve and the stud, the sleeve having oppositely positioned slots therein and bushings in the slots through which said pin passes and means for locking the pin in operative position.

4. A power take off structure as set forth in claim 1 further characterized in that the means for shifting the racks comprises a rod fastened to each rack and extending out of the driving end only of the casing, a ring member fastened to these extending rod ends, means operative for engaging said ring member to move said rods and racks and automatically acting means for disengaging said engaging means from the ring member when said operative means is rendered inoperative.

5. A power take off structure as set forth in claim 1 further characterized in that the means for shifting the racks comprises a rod fastened to each rack and extending out of the driving end only of the casing, a ring member fastened to these extending rod ends, a yoke structure having oppositely positioned fingers for engaging said ring member and a manually operative lever for moving said yoke to cause the fingers thereon to engage said ring member to cause it to move said rods and racks and resilient means for causing said yoke to move the fingers out of engagement with the ring member when the manual lever is released from its operative position.

6. A power take off structure as set forth in claim 1 further characterized in that the means for shifting the racks comprises a rod fastened to each rack and extending out of the driving end only of the casing, a ring member fastened to these extending rod ends, a yoke structure having oppositely positioned fingers for engaging said ring member and a manually operative lever for moving said yoke to cause the fingers thereon to engage said ring member to cause it to move said rods and racks and resilient means for causing said yoke to move the fingers out of engagement with the ring member when the manual lever is released from its operative position and further characterized in that the yoke structure carries an arm for operating an electrical switch to open the circuit of any electrical apparatus such as a dynamotor, which may be operated at the time by an outside source of power but which can be operated by the power take off structure by making a shift as herein described.

7. A power take off structure as set forth in claim 1 further characterized in that said receiving means for transmitting power from said structures includes a belt which connects said casing to a power receiving pulley fastened to a shaft supported by adjustable bearing with means for adjusting said bearing to regulate the tension of said belt while said shaft is flexibly coupled to a power delivery shaft.

8. A power take off structure as set forth in claim 1 further characterized in that said member carried by the driven shaft and having the clutch teeth thereon also carries a plurality of oil pick up and distributing devices for distributing oil through the power take off structure.

9. A power take off structure as set forth in claim 1 further characterized in that the casing end carrying the driven shaft is formed to provide a sump for the lubricating oil within the casing while said member carried by the driven shaft and having the clutch teeth thereon also carries a plurality of tubes formed and arranged to pick up oil from said sump and discharge it through the interior of the casing.

10. A power take off structure as set forth in claim 1 further characterized in that the casing end carrying the driven shaft is formed to provide a sump for the lubricating oil within the casing while said member carried by the driven shaft and having the clutch teeth thereon also carries a plurality of tubes formed and arranged to pick up oil from said sump and discharge it through the interior of the casing, and further characterized in that the driving end of the casing has an annular dam boss with openings therein located so as to govern the flow of oil in this part of the casing.

11. A power take off structure as set forth in claim 1 further characterized in that the casing end carrying the driven shaft is formed to provide a sump for the lubricating oil within the casing while said member carried by the driven shaft and having the clutch teeth thereon also carries a plurality of tubes formed and arranged to pick up oil from said sump and discharge it through the interior of the casing, and further characterized in that the driving end of the casing has at least two annular dam bosses to govern the flow of oil in this part of the casing, certain of the said bosses being adapted to be eliminated in the manufacture of the casing for the purpose described.

12. In combination with a power take-off structure for use on an automotive vehicle comprising, a rotatable casing having an outer surface to receive flexible driving means, a drive shaft capable of being operated by the vehicle engine positioned at one end of the casing and a driven shaft at the opposite end of the casing with means within the casing for connecting the two shafts together for a through drive or for connecting the drive shaft to the casing independent of the driven shaft, and a ring positioned exteriorly of the casing but carried by rods entering the casing to actuate said means within the casing with further means under direct control of an operator of the vehicle for engaging said ring to move it to bring about said through drive and for making complete disengagement from the ring when the casing is being rotated by the drive shaft.

13. The combination with a power take-off structure for use on an automotive vehicle as set forth in claim 12 further characterized in that a pulley is provided to receive said flexible driving means coming from said casing, said pulley being fastened to a shaft carried in bearings adjustably supported on vehicle frame member with means for simultaneously and similarly adjusting both bearings for the purpose described.

KIBBEY WHITMAN COUSE.